May 30, 1961 L. SUVERKROP 2,985,964
PLUMB BOBS
Filed June 10, 1958 2 Sheets-Sheet 1

Eccentricity
Cord hole
Cord

Lew Suverkrop
INVENTOR
BY
ATTORNEY

May 30, 1961  L. SUVERKROP  2,985,964
PLUMB BOBS
Filed June 10, 1958  2 Sheets-Sheet 2

Lew Suverkrop
INVENTOR
BY
ATTORNEY

United States Patent Office 2,985,964
Patented May 30, 1961

2,985,964

PLUMB BOBS

Lew Suverkrop, Box 436, Bakersfield, Calif.

Filed June 10, 1958, Ser. No. 741,175

13 Claims. (Cl. 33—216)

This specification covers an improvement in the plumb bob, that geometric instrument used to establish a location vertically above or below a point. The improvement applies particularly to the plain or "ordinary" kind of so-called precision plumb bob used in survey chaining, in construction, in machinery installation, etc. in which kind the cord issues from an encircling cord hole in a bob-top detachable from the plumb bob body. In general this improvement directs itself to reducing error in indications of plumb rendered by this kind of plumb bob.

To clarify both this specification and the objectives of the invention I shall here briefly discuss the subject of that error. It is of two kinds. The first are mechanical and their reduction depends on (1) choice of material for the bob that it be of uniform weight per unit volume throughout, and (2) close tolerances and skill in making the parts of the bob so that they will be mechanically symmetrical and also so that the completed bob will be (3) an assembly of the parts precisely about a single axis common to all of them. The other kind of such error is distinctly different: it is "geometrical."

This geometrical factor has to do with the position of the cord in the cord hole, and usually is a cause of greater error than all of the listed mechanical factors combined. Cord hole diameter is chosen to pass freely the thickest cord with which the bob may be used in service. Whatever diameter is chosen, the cord hole must be sufficiently larger so as to pass the cord. Otherwise, stringing the bob would be impracticable. In this kind of bob the cord is secured by a knot large enough to catch against the bob-top at the lower mouth of the cord hole. The knot is invariably an irregular form and so almost always causes the cord above it to take an eccentric location in the cord hole. Quite frequently it bears against the wall of the cord hole, giving maximum eccentricity. Since even the thickest usable cord must be smaller than the cord hole diameter, even such cord may be appreciably eccentric. However, in practice thick cord is almost never chosen for precise plumb bob work. For such work the very thinnest obtainable silk line is often used because it results in least possible wind disturbance that seriously impedes the work. But the thinner the cord, the greater will be the distance from the cord hole axis to the axis of cord bearing against the wall of the cord hole. Geometric eccentricity will be at its maximum. This means that presently such a plumb bob is least reliable for accuracy when used with the very kind of cord most chosen for accuracy.

The importance of these considerations is made obvious by the current Federal plumb bob specification GGG-P-501-c which limits suspended eccentricity to $\frac{1}{128}$ (=0.008) inch, due to all causes, geometric and other. My research, including detailed examination and measurement of both mechanical symmetry and suspended eccentricity of a large number of plumb bobs of many manufacturers including myself, demonstrates that the geometrical factor is a most important cause of error in this kind of bob. This invention specifically directs itself to reduction of error from this cause. More particularly, the object of the present invention is to provide (1) a simple, inexpensive attachment, (2) that can be used on various manufacturers' plumb bobs of this kind, and (3) with any thickness of cord usable with any one of them, which (4) eliminates the influence of the cord knot on location of the cord in the cord hole, and (5) causes the cord axis to take a position coincident with or close to the axis of the cord hole. These and other objects will be clear from the following description and the accompanying illustrations in which:

Figure 3:
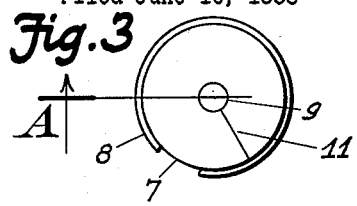
Fig. 3 is a plan view of the top of one form of device made according to this specification.
Figure 7:
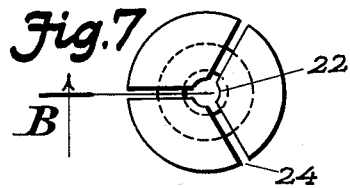
Fig. 7 is a plan view of the top of another form of device made according to this specification.
Figure 1:
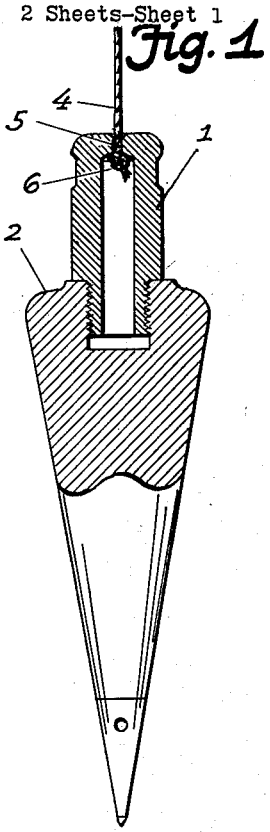
Fig. 1 is a cross section illustrative of a plumb bob of the kind to which this invention applies.
Figure 2:
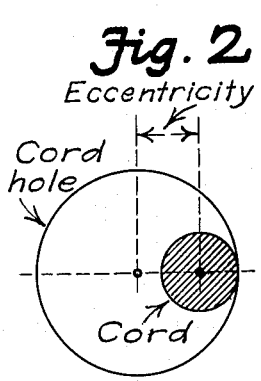
Fig. 2 is a diagram to illustrate the matter of eccentricity discussed herein.
Figure 6:
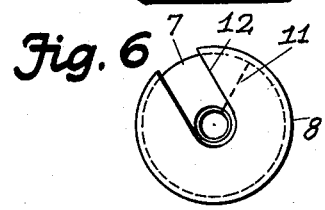
Fig. 6 is a view of the bottom of the device shown in Fig. 3.
Figure 10:
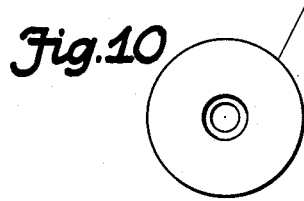
Fig. 10 is a view of the bottom of the device shown in Fig. 7.

The essential parts of the kind of plumb bob considered in this specification, shown in Fig. 1, are the bob-top 1 which is attached by threads to body 2, usually of brass, whose lower (apex) end is fitted with a standard steel plumb bob point. Cord 4 issues from a cord hole 5 in the bob-top 1 where it is secured by knot 6 in cord 4. Below cord hole 5 in bob-top 1 is a drilled hole sufficiently large to receive the knot 6 and, more than that, usually sufficient to facilitate removing the remaining knot 6 when the cord happens to break off close to the plumb bob. These features are common to all bobs of this kind. The outside shape of the bob-top 1 and whether a male or female thread is used on it, elements that vary among various manufacturers, are of no consequence in considering the present invention. As has been discussed hereinabove, practical considerations require that the cord always be smaller in diameter than the cord hole; and, as is made clear by Fig. 2, eccentricity may result between the axis of the cord and the center of the cord hole (and therefore the nominal axis of the plumb bob) amounting to as much as the radius of the cord hole less the radius of the cord. For this reason, for a given diameter of cord hole, the smaller the cord is, the greater the eccentricity may be, and the less reliable the plumb bob will be for precise work.

Figure 4:
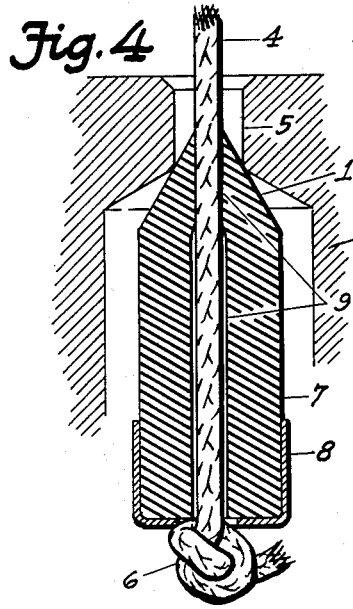
Fig. 4 is a cross section in the plane indicated by A in Fig. 3.
Figure 8:
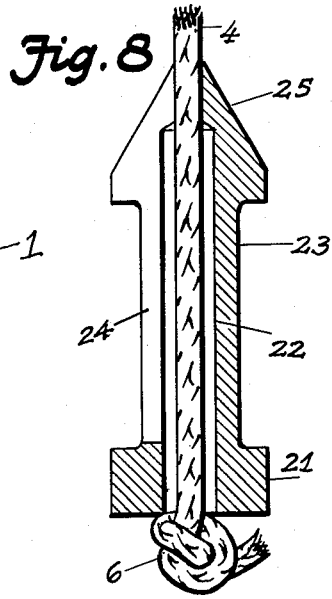
Fig. 8 is a cross section in the plane indicated by B in Fig. 7.
Figure 5:
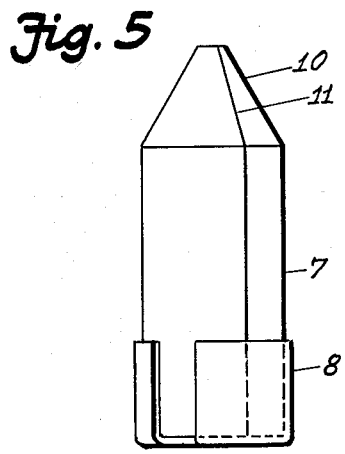
Fig. 5 is an elevation of the device shown in Fig. 3.
Figure 9:
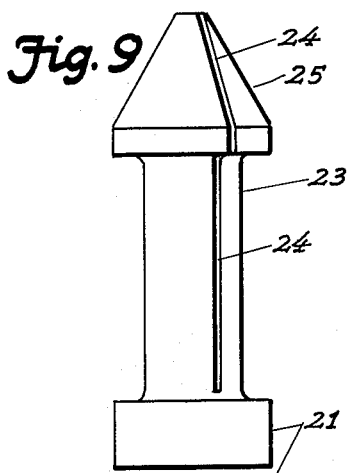
Fig. 9 is an elevation of the device shown in Fig. 7.

The device shown in Figs. 3 to 6 is a form of collet 7 of rubber or like material, preferably with a reinforcing cup 8 of material more resistant than rubber. Cup 8 withstands better the action of the knot 6 against collet 7 and helps prevent it being drawn through the hole 9 thereof. Hole 9 may be of any desired diameter, related to the diameter of cord 4 with which greatest accuracy is desired when the bob is in use. It may be relieved to larger diameter as shown in Fig. 4, except only the uppermost part of the hole 9 where the chosen diameter should prevail; and this part of hole 9 is made concentric with tapered surface 10. Access for cord 4 to hole 9 is provided by a slit 11 (as made by a knife) extending from the outer surface of collet 7 to the hole 9. A slot 12 in cup 8 is also provided for convenience in stringing the device, the width of this slot being about equal to the diameter of the cord hole 5.

The device may be applied to a plumb bob after stringing it in the usual manner. Collet 7 is opened at the slit 11 and the cord 4 (somewhat above knot 6) is thereby inserted in the opened hole 9 after which, upon relaxing, the rubber of collet 7 closes upon cord 4. Making use of slot 12, cup 8 is passed on to cord 4 and then pressed into position on the bottom of collet 7. Cord 4 is then drawn through hole 9 sufficiently to bring the knot 6 securely against the bottom of the device. In use the weight of the plumb bob causes the tapered surface 10 to enter the lower end of the cord hole 5 as far as the tapered surface 10 will permit; and unlike the action of the irregularities of a knot, the regular and concentric tapered surface 10 in the cord hole 5 acts to bring the cord 4 to the center of cord hole 5. If hole 9 happens to be somewhat larger than the diameter of cord 4, the reaction at the mouth of cord hole 5 will cause the resilient material of collet 7 under tapered surface 10 to compress so as to reduce diameter of hole 9, thereby grasping cord 4. On the other hand, if cord 4 happens to be somewhat larger than hole 9, the resilience of the material will permit hole 9 to open up while maintaining a nearly complete ring of material of substantially uniform thickness between cord 4 and the walls of cord hole 5. The device thus provides desired concentricity between cord and cord hole through a considerable range of cord thicknesses, including thinner cords most liable to eccentricity.

Figs. 7 to 10 show another centralizing device made according to this specification, with construction suitable for making it of metal or other material suitable to screw-machine production. Made from round stock, body 21 is drilled with hole 22 for cord 4. Preferably, the upper part of hole 22 is of the desired size chosen as suitable for the cord 4 while the remainder of hole 22 is made larger for convenience in stringing the device as well as to aid in giving the device resilience in its final form. Also for this latter purpose a considerable length of the device is turned to a smaller diameter 23. Before slotting the device with equally spaced slots 24, the upper end is provided with an acute taper 25. Slots 24 are sufficiently long, in combination with the reduced cross sectional area in the middle of the device, to divide the body 21 into a number of resilient leaves so that cord 4 of various thicknesses may be passed through hole 22 and slight centripetal pressure upon the taper 25 will cause the upper part of hole 22 to close upon cord 4. The resilience of the leaves between slots 24 combined with the taper 25 bearing against the lower mouth of the cord hole 5, due to the weight of the plumb bob, thus causes cord 4 to center in the collet and take a central position in cord hole 5. The foregoing description will make the application of the device to the cord of a plumb bob apparent to those familiar with plumb bobs. As shown, the cord 4 must be passed through hole 9. However, one of the slots 24 may be widened at the bottom of the device and there extended to the bottom thereof so as to give access for cord 4 entirely from the side of the collet.

Figs. 11 to 15 show still another centralizing device made according to this specification, with construction that lends itself to the economical processes of blanking and forming from thin sheet metal. I have found that sheet steel, having the spring and forming qualities found in steel shim stock, roughly 0.008 inch thick, is a material that lends itself especially well for economical production of the device in this form, and functions properly when in use.

Figure 11:
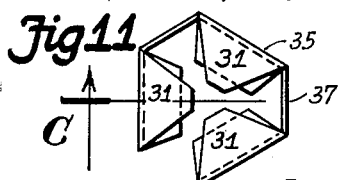
Fig. 11 is a plan view of the top of yet another form of the device made according to this specification.
Figure 15:
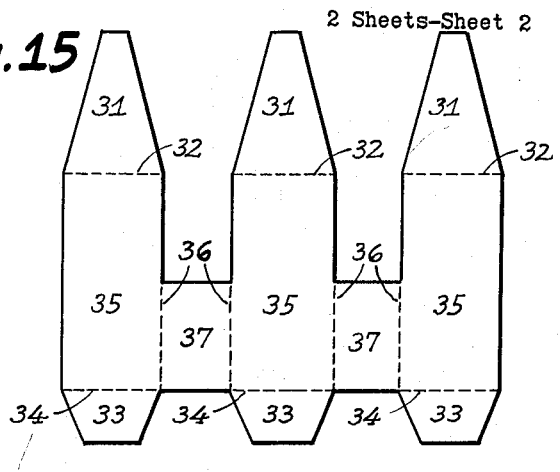
Fig. 15 is a layout showing the outline shape of the sheet metal before bending and forming it into the device shown in Fig. 11.
Figure 12:
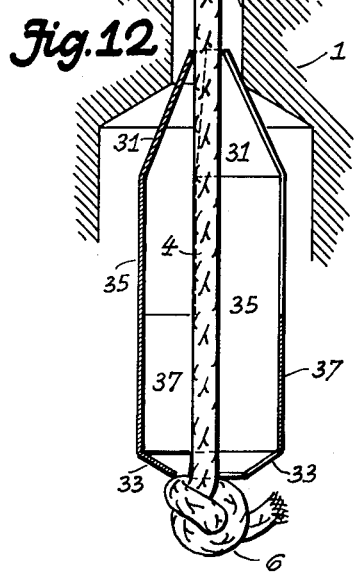
Fig. 12 is a cross section in the plane indicated by C in Fig. 11.
Figure 13:
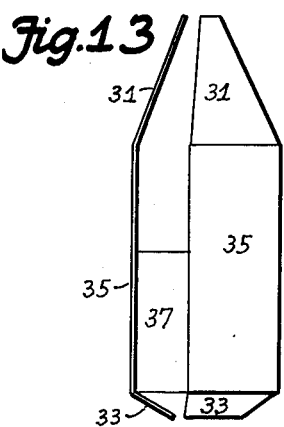
Fig. 13 is an elevation of the device shown in Fig. 11.
Figure 14:
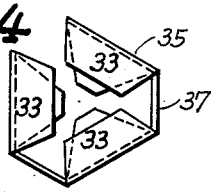
Fig. 14 is a view of the bottom of the device shown in Fig. 11.
Figure 16:
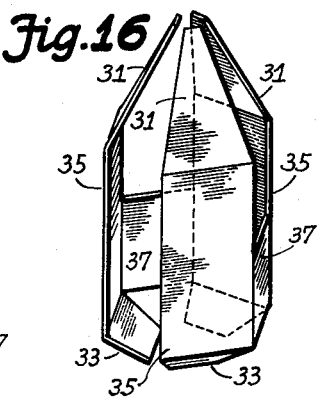
Fig. 16 is a perspective of the device shown in Figs. 11 to 15.

For making this form of the device, the thin sheet is first blanked as outlined in Fig. 15, a form comparable to three pickets on a fence with a single rail, the pickets corresponding in the finished device to the leaves of the collet where the rail becomes that which holds the collet leaves in proper working position. As will be seen by referring also to Figs. 11 to 14 and particularly to the perspective in Fig. 16, truncated-triangular parts 31 are folded downward along lines 32, and truncated-triangular parts 33 are folded downward along lines 34, each with respect to the remainders 35 of the collet leaf parts. (These remainders 35 as will be seen from the drawings form the upright part in the finished collet.) After this, the leaves are bent inward through an angle of about 60° along lines 36 so that truncated-triangular parts 31 and 33 are inclined symmetrically toward the axis of the symmetrical six-sided right prism formed by the vertical lines of parts 35 and 37. The shapes of the parts making up the outline shown in Fig. 15 and the folding are so proportioned that the narrow upper end of the relaxed collet will just touch a thin cord 4. Similarly, the lower end of the collet will provide an opening sufficiently large so that a large cord 4 may be readily forced to the center of the device, and at the same time sufficiently small to hold against a knot in the smallest usable cord. As indicated in Figs. 11 and 12, truncated-triangular parts 31 are sufficiently narrow at the upper end so that (excepting only cord very nearly the diameter of the cord hole) they may enter cord hole 5 with cord 4, while their tapering edges bear against the edge at the bottom of hole 5. The latter, acting on the thin, springy leaves of the device causes parts 31 to press against cord 4 and move the cord 4 toward the axis of cord hole 5. The fact that this form of collet is left open at one side obviates passing cord 4 through an encircling hole in the device and greatly facilitates its application to a plumb bob cord 4. Making use of this fact and the springy character of the completed device, its lower end is first snapped over the cord 4 and then its conical upper end formed by the truncated-triangular parts 31 is slipped onto the cord. The device is then brought down to the prepared knot 6, the cord is withdrawn until it seats in bob-top 1 which is assembled with the plumb bob and the device is ready for use. Measurements prove that even when the uniformly shaped parts are, by repeated application, appreciably bent out of shape, it functions well in achieving its objective of improved suspended plumb bob precision.

Detailed examination and measurement of commercial plumb bobs of the kind here considered showed great reduction in suspended eccentricity when used with any of the forms of the device herein described. Without the device these plumb bobs showed suspended eccentricity in some cases exceeding $\frac{1}{32}$ (=0.031) inch. With the device, the suspended eccentricity of these same bobs was reduced to a matter of a few thousandths of an inch.

Some of the details disclosed in this specification are applicable and may be used in other devices, and may be used in entirely different arts. Moreover, while I have illustrated and described preferred forms of construction, I do not wish to limit myself to the precise details of structure shown in the drawings, but desire to avail myself of such variations and modifications as come within the scope of the appended claims.

I claim:

1. A device for centering the plumb bob cord in the cord hole of the bob-top of a plumb bob, comprising a collet having an upright channel therein to receive the cord, and means to prevent the cord from sliding through the collet and which means causes the weight of the suspended plumb bob through its bob-top to bear on the upper end of the collet, the upper end of the collet being made concentric with said channel and sloping inwardly and upwardly to engage the bob-top beneath the cord hole thereof in such manner that upon suspending the plumb bob when said channel is eccentric with said cord hole there develops a horizontal component of force which causes the collet to move laterally with respect to the bob-top in the direction of said channel to become concentric with said cord hole.

2. A plumb bob having a hollow top connected coaxially to the upper end of the body of the plumb bob and having a central hole in the outer end of greater diameter than that of a cord from one end of which the plumb bob is to be suspended, cord centering means within said hollow top engaging said end of said cord to prevent separative movement therebetween in a direction axially outward from the upper end of said plumb bob, and coengaging means on said centering means and hollow top operable by the weight of said plumb bob upon said cord when suspended therefrom to center said cord within said central hole in said top.

3. A plumb bob having a hollow top connected coaxially to the upper end of the body of the plumb bob and having a central hole in the outer end of greater diameter than that of the cord from one end of which the plumb bob is to be suspended, and cord centering means movable within said hollow top and connectable with said end of said cord to prevent separative movement therebetween in a direction axially outward from the upper end of said plumb bob, said centering means having tapered means on the upper end thereof engageable with the perimeter of the hole in said hollow top and operable by the weight of said plumb bob upon said cord when suspended therefrom to center said cord within said central hole in said top.

4. A plumb bob having a hollow top connected coaxially to the upper end of the body of the plumb bob, said top having a central hole in the outer end thereof of greater diameter than that of the cord from one end of which the plumb bob is to be suspended, and cord centering means movable within the interior of said hollow top and connectable with said end of the cord to prevent relative movement in a direction axially outward from said centering means, said centering means also having a vertical passage means in the upper end thereof engaging said cord for relative centering and further means at the upper end of said centering means engageable with the center hole in said hollow top and operable by the weight of said plumb bob upon said cord to center said cord relative to said central hole in said top.

5. A plumb bob having a hollow top connected coaxially to the upper end of the body of the plumb bob, said top having a central hole in the outer end thereof of greater diameter than that of the cord from one end of which the plumb bob is to be suspended, and cord centering means movable within the interior of said hollow top in the upper end thereof and said passage means and connectable with said end of the cord to prevent relative movement in a direction axially outward from said centering means, said centering means also having vertical passage means in the upper end thereof and said passage means being radially movable inward in opposite directions to engage said cord to center the same relative to the upper end of said centering means by the weight of the plumb bob being exerted upon said centering means when said plumb bob is suspended from said cord, said centering means also including means on the upper end thereof engageable with the center hole in said hollow top and operable to center said cord relative to said central hole in said top.

6. A plumb bob having a hollow top connected to the upper end of the body of the plumb bob and said top having a hole in the outer end thereof coaxial with the body of said bob and of greater diameter than that of the cord from one end of which the plumb bob is to be suspended, and a collet of smaller cross-sectional size than the interior of said hollow top and movable vertically therein, said collet having a vertical passage therein to receive said cord and radially movable means at the upper end thereof engageable with said cord to center the same relative to the upper end of the collet, said collet also having means engageable with said cord to prevent separative movement therebetween in a direction extending axially outward from the upper end of said plumb bob and also having means on the upper end thereof engageable with said hollow top and operable by the weight of said plumb bob upon said cord and collet to cause said radially movable means thereon to center said cord relative to the upper end of said collet and also to cause said collet to be centered relative to the central hole in said top.

7. A plumb bob having a hollow top connected coaxially to the upper end of the body of the plumb bob, said top having a central hole in the outer end thereof of greater diameter than that of the cord from one end of which the plumb bob is to be suspended, and a collet of smaller cross-sectional size than the interior of said hollow top and movable vertically therein, said collet having a vertical passage therein to receive said cord and radially movable means at the upper end thereof engageable with said cord to center the same relative to the upper end of the collet, said collet also having means thereon engageable with said cord to prevent separative movement therebetween in a direction extending axially outward from the upper end of said plumb bob and also having tapered means on the upper end thereof engageable with the perimeter of said hole in said hollow top and operable by the weight of said plumb bob upon said cord and collet to center said cord relative to the upper end of said collet and also to center said collet relative to the central hole in said top.

8. A plumb bob having a hollow top connected coaxially to the upper end of the body of the plumb bob, said top having a central hole in the outer end thereof of greater diameter than that of the cord from one end of which the plumb bob is to be suspended, and a collet of smaller cross-sectional size than the interior of said hollow top and movable vertically therein, said collet having a vertical passage therein to receive said cord and also being slotted to provide a plurality of leaves radially movable at the upper ends thereof for engagement with said cord to center the same relative to the upper end of the collet, said collet also having means on the lower end thereof also engageable with said cord to prevent separative movement therebetween in a direction extending axially upward of said collet and also having tapered means on the upper end thereof engageable with the perimeter of said hole in said hollow top and operable by the weight of said plumb bob upon said cord and collet to move said fingers to center said cord relative to the upper end of said collet and also to center said collet relative to the central hole in said top.

9. A plumb bob having a hollow top connected coaxially to the upper end of the body of the plumb bob, said top having a central hole in the outer end thereof of greater diameter than that of the cord from one end of which the plumb bob is to be suspended, and a collet of smaller cross-sectional size than the interior of said hollow top and movable vertically therein, said collet being formed from compressible material and having a vertical passage substantially centrally therethrough to receive said cord and having means on the lower end of said collet engageable with said cord to prevent separative movement therebetween in a direction extending axially upward of said collet and tapered means on the upper end thereof engageable with the perimeter of said hole in said hollow top and operable by the weight of said plumb bob upon said cord and collet to compress the upper end of said collet radially inward against said cord and thereby center said cord relative to the upper end of said collet and also to center said collet relative to the central hole in said top.

10. A plumb bob having a hollow top connected coaxially to the upper end of the body of the plumb bob, said top having a central hole in the outer end thereof of greater diameter than that of the cord from one end of which the plumb bob is to be suspended, and a collet of smaller cross-sectional size than the interior of said hollow top and movable vertically therein, said collet having a vertical passage therein to receive said cord and also being substantially circular in cross-section and longitudinally slotted from the upper end to provide a plurality of flexible leaves radially movable inward at the upper ends thereof and engageable with said cord to center the same relative to the upper end of the collet, the lower end of said collet being arranged to be abutted by a knot on the lower end of said cord to prevent separative movement therebetween in a direction extending axially upward from said collet and the upper end of said leaves of said collet being engageable with said hollow top and operable by the weight of said plumb bob upon said cord and collet to move the upper ends of said leaves into engagement with said cord and thereby center said cord relative to the upper end of said collet and also to center said collet relative to the central hole in said top.

11. A plumb bob having a hollow top connected coaxially to the upper end of the body of the plumb bob, said top having a central hole in the outer end thereof of greater diameter than that of the cord from one end of which the plumb bob is to be suspended, and a collet of smaller cross-sectional size than the interior of said hollow top and movable vertically therein, said collet being formed from flexible sheet material and shaped to provide a plurality of similar leaves positioned around a vertical axis within said hollow top and connected together to form a collet of polygonal cross-section having an axial opening therein to receive said cord, the upper ends of said leaves sloping upward and inward toward the axis of the collet and being radially movable into engagement with said cord to center the same relative to the upper end of the collet, the lower end of said collet also being engageable by a knot on the lower end of said cord to prevent separative movement therebetween in a direction extending axially upward from said collet, the sloping upper ends of said leaves being engageable with the perimeter of the hole in said hollow top and operable by the weight of said plumb bob upon said cord and collet to move said upper ends of said leaves radially inward to engage said cord and thereby center said cord relative to the upper end of said collet and also to center said collet relative to the central hole in said top.

12. The plumb bob set forth in claim 11 further characterized by the lower ends of said leaves being bent inwardly toward the axis of the collet to form means to be abutted by a knot in the end of the cord and thereby prevent separative movement between said cord and collet in an upward direction from said collet.

13. The plumb bob set forth in claim 11 further characterized by said collet having a longitudinal space between two of said leaves comprising an inlet for the cord to the interior of said collet.

References Cited in the file of this patent
UNITED STATES PATENTS

| | | |
|---|---|---|
| 1,349,565 | Ewing et al. | Aug. 17, 1920 |
| 1,357,270 | Bush | Nov. 2, 1920 |